Oct. 1, 1957 — J. A. DEAN — 2,808,013
SOIL IRRIGATOR
Filed Jan. 28, 1954
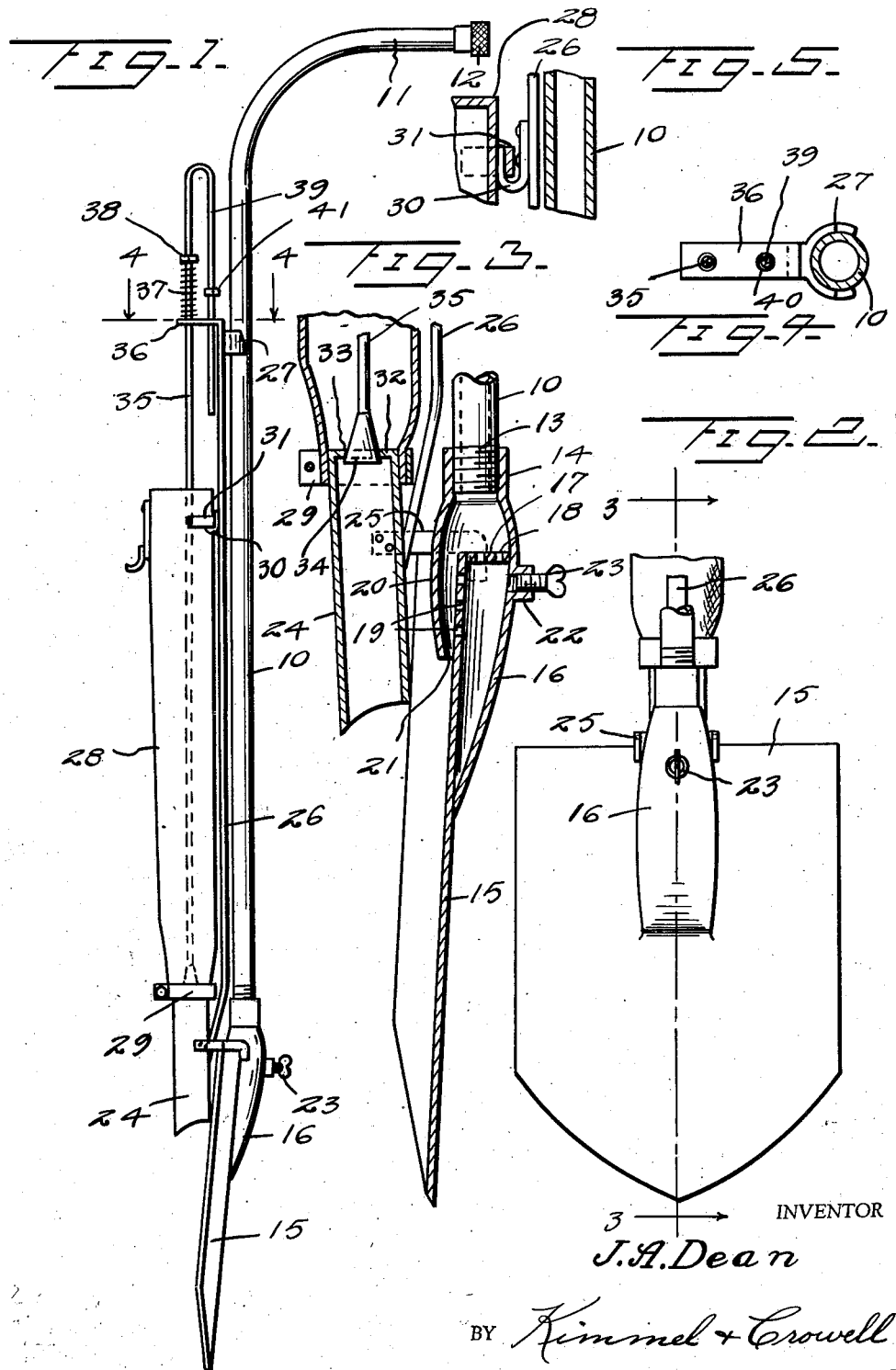
INVENTOR
J. A. Dean
BY Kimmel & Crowell
ATTORNEYS

2,808,013

SOIL IRRIGATOR

John A. Dean, Portland, Oreg.

Application January 28, 1954, Serial No. 406,711

2 Claims. (Cl. 111—7.1)

This invention relates to a soil irrigator and vitalizer, and has as its primary object the provision of a device in the form of a spade or shovel for turning the soil, having means associated therewith whereby water may be provided through a hollow handle and simultaneously fertilizer, vitamins, or the like, may be dissolved by the inserted fluid and pass into the soil by the turning thereof.

An additional object of the invention is the provision of a device of this character having control means whereby the fertilizer may be selectively inserted or discontinued as desired.

Still another object of the invention is the provision of an implement of this nature which is so constructed and arranged as to be readily wielded by hand.

Still other objects reside in the combination of elements, arrangement of parts, and features of construction, all as will be more fully pointed out hereinafter and disclosed in the accompanying drawing wherein there is shown a preferred embodiment of this inventive concept.

In the drawing:

Figure 1 is a detail side elevation of one form of implement embodying features of the instant invention.

Figure 2 is a fragmentary rear elevation of the device.

Figure 3 is an enlarged sectional detail view taken substantially along the line 3—3 of Figure 2, as viewed in the direction indicated by the arrows.

Figure 4 is an enlarged sectional view taken on the line 4—4 of Figure 1.

Figure 5 is a fragmentary vertical section showing the bag supporting means.

Similar reference characters refer to similar parts throughout the several views of the drawing.

Having reference now to the drawing in detail, the implement of the instant invention includes a handle or shank portion generally indicated at 10, at the upper extremity of which is provided a right angled bent portion 11 having a swivel nut 12 for connection with a hose or similar water introducing means.

Handle 10 is obviously of hollow construction and terminates at its lower end in a threaded extremity 13 which is engaged by a socket 14 which comprises an integral element of a shovel blade 15.

As shown in Figure 3, the blade 15 has fixed to the rear side thereof a fertilizer reservoir 16 formed with a top wall 17 having openings 18 which communicates the socket 14 with the reservoir 16. The blade 15 is formed with a series of openings 19 communicating with the reservoir 16 so that dissolved fertilizer will flow out from reservoir 16 through openings 19 along the forward side of blade 15.

Socket 14 includes a downwardly and inwardly curved wall 20 confronting the openings 19, and the lower end of wall 20 is spaced from the forward side of blade 15, as indicated at 21, so that the mixture of water and fertilizer may pass downwardly over the front concave side of blade 15.

Reservoir 16 is provided with a boss 22 within which plug 23 is threaded so that upon the removal of the plug fertilizer may be inserted into reservoir 16.

In order to provide a means whereby a dry fertilizer or vitalizer may be discharged on the forward side of blade 15, I have provided a tubular nozzle 24 which is disposed on the forward side of blade 15 and is supported by means of a pair of clamping hooks 25 engaging over the upper edge of blade 15.

An outwardly projecting supporting bar 26 is fixed to nozzle 24 and projects upwardly along side the handle 10 and has fixed adjacent the upper end thereof an arcuate resilient clamp 27 engaging about the handle 10. A flexible fertilizer holding bag 28 is secured by means of a clamping band 29 about the upper end of the nozzle 24 and is supported in substantially vertical position by means of a hook 30 carried by the bar 26.

A loop or strap 31 is fixed to the upper portion of the bag 28 and engages over the hook 30. The nozzle 24 is formed with a top wall 32 having a tapered valve seat 33 and a substantially conical valve plug 34 normally engages in the seat 33 so as to close the opening in the wall 32.

An outwardly projecting stem or rod 35 is fixed to the valve plug 34 and loosely or slidably engages through a right angularly projecting guide extension 36 carried by bar 26.

A spring 37 engages about stem or rod 35 and bears at its lower end against the upper side of extension 36, and bears at its upper end against a collar 38 secured about the rod or stem 35.

The rod or stem 35 includes a reverted downwardly projecting extension 39 slidably engaging through a second opening 40 formed in the extension 36, and a stop collar 41 is adjustably secured to the extension 39 and limits the downward movement of extension 39 and stem 35 to valve opening position.

In the use and operation of this device, a soluble fertilizer or vitalizer may be charged into the reservoir 16, and the coupling 12 may be connected to a source of water supply. As the blade 15 is projected into the ground, water will flow through opening 21 and this water will have mixed therewith dissolved fertilizer or other soil vitalizing material which passes from reservoir 16 through openings 19.

The soil may be impregnated with a dry fertilizer which may be moistened at the time the blade 15 is projected into the ground by filling bag 28 with a dry fertilizer and moving valve 34 downwardly to open position so that the dry fertilizer may drop downwardly through nozzle 24 along the front side of blade 15.

From the foregoing, it will now be seen that there is herein provided an improved implement of this character which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In combination, a shovel blade, a threaded socket fixed to the upper edge of said blade, a tubular handle threaded in said socket, means for connecting said handle to a source of water supply, a reservoir fixed to the back side of said blade, said reservoir having an apertured top wall confronting said socket, and a depending arcuate wall projecting from said socket and confronting the forward concave side of said blade, the lower edge of said arcuate wall being spaced from said blade to thereby form a nozzle, said blade having openings therethrough communicating said reservoir with the space above the lower edge of said arcuate wall.

2. In combination, a shovel blade, a threaded socket fixed to the upper edge of said blade, a tubular handle threaded in said socket, means for connecting said handle to a source of water supply, a mixing chamber-reservoir fixed to the back side of said blade, said mixing chamber-reservoir having an apertured top wall confronting said socket, and a depending wall projecting from said socket and confronting the forward side of said blade, the lower edge of said depending wall being spaced from said blade to thereby form a nozzle, said blade having openings therethrough communicating said mixing chamber-reservoir with the space between said depending wall and said blade above said nozzle.

References Cited in the file of this patent

UNITED STATES PATENTS

| | | |
|---|---|---|
| 74,231 | Lawson | Feb. 11, 1868 |
| 75,843 | Bergstresser | Mar. 24, 1868 |
| 158,129 | Robinson | Dec. 22, 1874 |
| 563,195 | Lyon | June 30, 1896 |
| 2,181,189 | Lathan | Nov. 28, 1939 |
| 2,505,174 | Daniels | Apr. 25, 1950 |
| 2,611,514 | Peyton | Sept. 23, 1952 |

FOREIGN PATENTS

| | | |
|---|---|---|
| 16,469/28 | Australia | Oct. 18, 1929 |
| 271,841 | Switzerland | Feb. 16, 1951 |